United States Patent
Mullett

(10) Patent No.: US 10,286,918 B2
(45) Date of Patent: May 14, 2019

(54) IN-CABIN AIR QUALITY SENSING AND PURGE SYSTEM FOR AUTONOMOUS VEHICLES

(71) Applicant: DENSO International America, Inc., Southfield, MI (US)

(72) Inventor: Reilly Patrick Mullett, Livonia, MI (US)

(73) Assignee: DENSO International America, Inc., Southfield, MI (US)

( * ) Notice: Subject to any disclaimer, the term of this patent is extended or adjusted under 35 U.S.C. 154(b) by 247 days.

(21) Appl. No.: 15/252,666

(22) Filed: Aug. 31, 2016

(65) Prior Publication Data

US 2018/0057013 A1 Mar. 1, 2018

(51) Int. Cl.
*B60W 50/00* (2006.01)
*B60H 1/00* (2006.01)
*B60J 1/12* (2006.01)

(52) U.S. Cl.
CPC ......... *B60W 50/0098* (2013.01); *B60H 1/008* (2013.01); *B60H 1/00821* (2013.01); *B60J 1/12* (2013.01); *B60W 2530/00* (2013.01); *B60W 2550/12* (2013.01); *B60W 2710/30* (2013.01)

(58) Field of Classification Search
CPC .......................... B60H 1/008; B60H 1/00821; B60W 50/0098
See application file for complete search history.

(56) References Cited

U.S. PATENT DOCUMENTS

| | | | | |
|---|---|---|---|---|
| 5,450,894 | A * | 9/1995 | Inoue ................. | B60H 1/00285 165/43 |
| 6,454,178 | B1* | 9/2002 | Fusco ................ | B60H 1/00742 165/203 |
| 2003/0158644 | A1* | 8/2003 | Basson ............ | G08B 13/19647 701/49 |
| 2007/0025597 | A1* | 2/2007 | Breed .................... | B60N 2/002 382/104 |
| 2008/0188172 | A1* | 8/2008 | Hollemans ......... | B60H 1/00742 454/75 |
| 2008/0202139 | A1* | 8/2008 | Darroman .......... | B60H 1/00742 62/244 |

(Continued)

FOREIGN PATENT DOCUMENTS

JP H04173424 A 6/1992

*Primary Examiner* — Jelani A Smith
*Assistant Examiner* — Donald J Wallace
(74) *Attorney, Agent, or Firm* — Harness, Dickey & Pierce, P.L.C.

(57) ABSTRACT

A system and method are provided and include at least one sensor and a controller. The at least one sensor generates data related to indoor air conditions of an autonomous vehicle. The at least one sensor includes at least one of a smoke sensor and an odor/air quality sensor. The controller is in communication with the at least one sensor and controls at least one vehicle system of the autonomous vehicle based on the data related to indoor air conditions of the autonomous vehicle received from the at least one sensor. The at least one vehicle system includes at least one of an HVAC system and a window actuator system. The controller controls the at least one vehicle system to purge and/or exhaust at least one of smoke and an odor detected within the autonomous vehicle.

12 Claims, 3 Drawing Sheets

(56) References Cited

U.S. PATENT DOCUMENTS

| | | | |
|---|---|---|---|
| 2009/0031741 A1* | 2/2009 | Hara | B60H 1/00735 62/239 |
| 2009/0081938 A1* | 3/2009 | Kim | B60H 1/008 454/75 |
| 2012/0315835 A1* | 12/2012 | Maranville | B60H 1/00742 454/75 |
| 2014/0373446 A1* | 12/2014 | Weidenbacher | E05F 15/695 49/31 |
| 2015/0136376 A1* | 5/2015 | Niemann | B60H 1/00742 165/202 |
| 2018/0022182 A1* | 1/2018 | Miller | B60H 1/00064 |

* cited by examiner

IN-CABIN AIR QUALITY SENSING AND PURGE SYSTEM FOR AUTONOMOUS VEHICLES

FIELD

The present disclosure relates to in-cabin air quality sensing and purge systems and methods for autonomous vehicles and, in particular, to in-cabin air quality sensing and purge systems and methods for autonomous vehicles that are used for public or shared transportation.

BACKGROUND

This section provides background information related to the present disclosure, which is not necessarily prior art.

Systems exist for autonomous or self-driving vehicles, which can be used as a form of public or shared transportation. For example, a passenger may be able to use a computing device to request that an autonomous or self-driving vehicle pick up the passenger at a designated location and transport the passenger to a designated destination. The passenger, however, may not be considerate of the next potential passenger and may smoke or leave unpleasant odors in the vehicle that may be encountered by the next passenger.

SUMMARY

This section provides a general summary of the disclosure, and is not a comprehensive disclosure of its full scope or all of its features.

The present teachings include systems and methods for sensing and purging smoke and/or odors within an autonomous vehicle.

The present teachings include a system comprising at least one sensor and a controller. The at least one sensor generates data related to indoor air conditions of an autonomous vehicle. The at least one sensor includes at least one of a smoke sensor and an odor/air quality sensor. The controller is in communication with the at least one sensor and controls at least one vehicle system of the autonomous vehicle based on the data related to indoor air conditions of the autonomous vehicle received from the at least one sensor. The at least one vehicle system includes at least one of an HVAC system and a window actuator system. The controller controls the at least one vehicle system to purge and/or exhaust at least one of smoke and an odor detected within the autonomous vehicle.

The present teachings also include a method. The method includes generating, with at least one sensor, data related to indoor air conditions of an autonomous vehicle, the at least one sensor including at least one of a smoke sensor and an odor/air quality sensor. The method also includes receiving, with a controller, the generated data related to indoor air conditions of the autonomous vehicle. The method also includes controlling, with the controller, at least one vehicle system of the autonomous vehicle based on the generated data related to indoor air conditions of the autonomous vehicle received from the at least one sensor, the at least one vehicle system including at least one of an HVAC system and a window actuator system. The controller controls the at least one vehicle system to purge and/or exhaust at least one of smoke and an odor detected within the autonomous vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

To address the above issues, the present teachings include a system for air quality sensing and automatically purging or exhausting smoke or other unpleasant odors from an autonomous or self-driving vehicle both while transporting a passenger to a designated destination and while the vehicle is vacant and waiting for the next passenger or traveling to pick up the next passenger.

Figure 1:
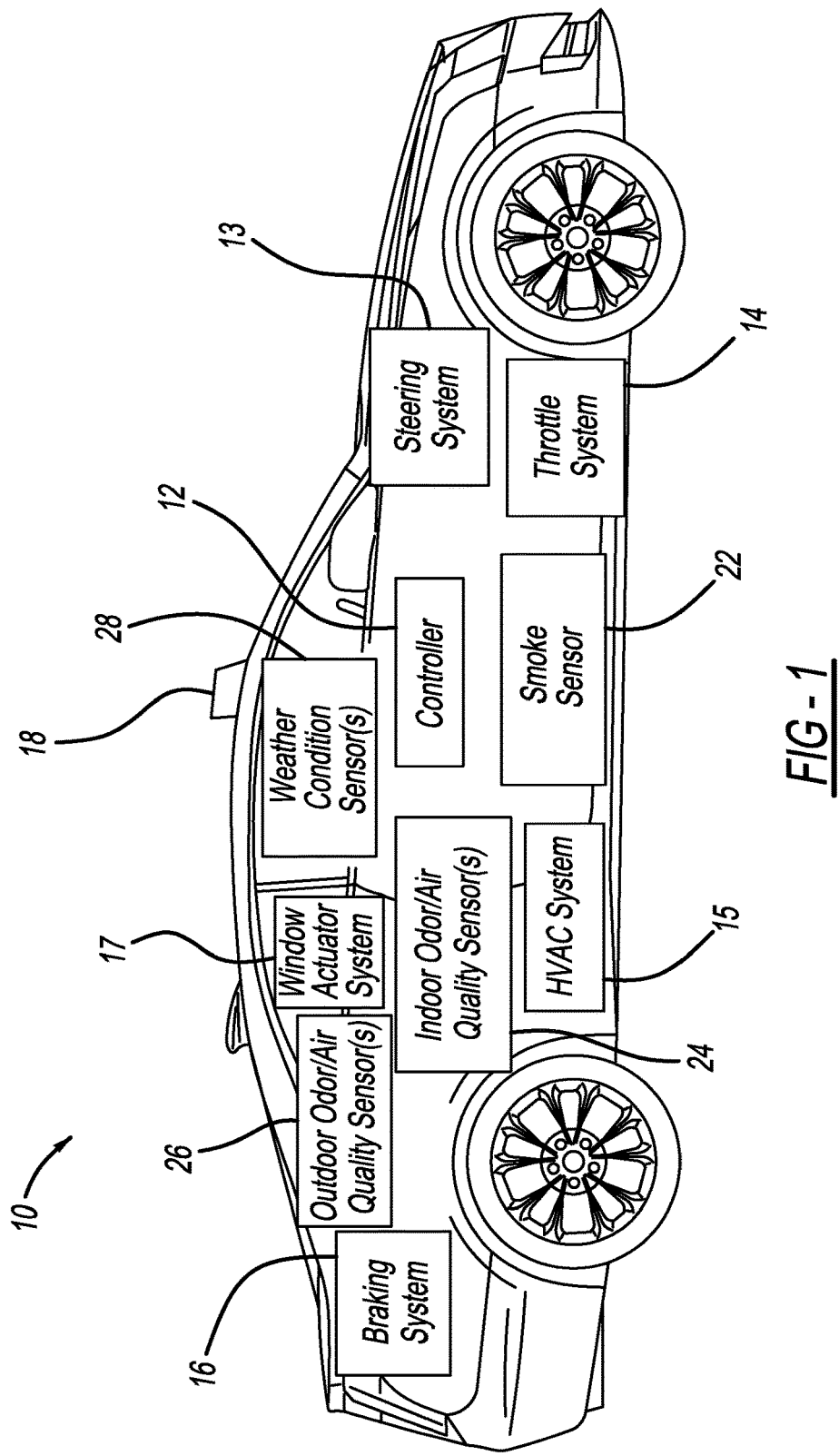
FIG. 1 illustrates an autonomous vehicle according to the present teachings.

With reference to FIG. 1, an autonomous vehicle 10 is illustrated and includes a controller 12, a steering system 13, a throttle system 14, an HVAC system 15, a braking system 16, and a window actuator system 17.

The autonomous vehicle 10 also includes one or more environmental sensors 18 to sense information about the surroundings of the autonomous vehicle. For example, the environmental sensors 18 may include an image sensor, such as a camera, mounted to a roof, a windshield, and/or other locations of the autonomous vehicle 10. Additionally, the environmental sensors 18 may include a Lidar sensor, a radar sensor, an ultrasonic sensor, or other sensors for detecting information about the surroundings of the autonomous vehicle 10, including, for example, other vehicles, lane lines, guard rails, objects in the roadway, buildings, pedestrians, etc., While the environmental sensors 18 are shown in FIG. 1 as a single entity, additional environmental sensors may be located on or around the autonomous vehicle 10. For example, the autonomous vehicle 10 may include a rear-facing sensor for sensing objects behind the autonomous vehicle 10. The autonomous vehicle 10 may also include a global positioning system (GPS) and corresponding GPS sensors.

The autonomous vehicle 10 also includes weather condition sensor(s) 28 to determine weather conditions, including, for example, the current outdoor temperature, whether it is a sunny day, raining, cloudy, etc., and/or other applicable weather related information.

The controller 12 receives data about the surroundings of the autonomous vehicle 10 from the environmental sensors 18 and the weather condition sensor(s) 28 and uses the received data for driving the autonomous vehicle 10. For example, the controller uses the received data to control the steering system 13, the throttle system 14, and the braking system 16 to drive the vehicle to a particular location. For example, the location may be a pickup location to pick up a passenger that has requested transportation via the autonomous vehicle 10 through a smartphone application that communicates with the controller 12 through a server. The autonomous vehicle 10 may include one or more passenger detection sensors to detect whether passengers are present in the autonomous vehicle 10. In this way, the controller 12 can determine, based on the data from the one or more passenger detection sensors that passenger(s) have entered the vehicle. Additionally or alternatively, the controller 12 can determine that passenger(s) have entered the vehicle based on the vehicle request control logic. For example, the controller 12 can determine that passenger(s) have entered the autonomous vehicle 10 once the autonomous vehicle 10 has arrived at the pickup location and the doors of the autonomous vehicle 10 have been opened and closed. Additionally, the location may be a drop off destination where the passenger is to be dropped off. The passenger, for example, can enter the drop off destination through a smartphone application that communicates with the controller 12 through a server. Alternatively, the smartphone application may communicate directly with the controller 12 through a wired or wireless connection.

The autonomous vehicle 10 also includes a smoke sensor 22, indoor odor/air quality sensor(s) 24, and outdoor odor/air quality sensor(s) 26. The indoor odor/air quality sensor(s) 24 and the outdoor odor/air quality sensor(s) 26 may be sensors that detect the presence of certain chemicals or substances in the air within the cabin of the vehicle and outside of the vehicle, respectively. The indoor odor/air quality sensor(s) 24 and the outdoor odor/air quality sensor(s) 26 may communicate a sensed level of the chemicals or substances to the controller 12 or may communicate an alert to the controller 12 once the sensed level of the chemicals or substances exceeds a predetermined threshold.

The controller 12 receives information about the air quality within the autonomous vehicle 10 and outside of the autonomous vehicle 10 from the smoke sensor 22, the indoor odor/air quality sensor(s) 24, and the outdoor odor/air quality sensor(s) 26. The controller 12 can then control the HVAC system 15 and/or the window actuator system 17 to purge and exhaust smoke and/or unpleasant odors from the autonomous vehicle 10. For example, if a passenger begins to smoke while in the autonomous vehicle 10, the smoke sensor 22 may communicate that smoke is present in the cabin of the autonomous vehicle 10 and the controller 12 may control the window actuator system 17 to crack one or more windows of the autonomous vehicle 10 and/or may control the HVAC system 15 to increase air circulation within the autonomous vehicle 10. The HVAC system 15, for example, may include an air filter that can remove smoke and/or odors from the circulated air within the autonomous vehicle. Similarly, if the indoor odor/air quality senses the presence of an odor within the autonomous vehicle 10 while a passenger is present in the autonomous vehicle 10, the controller may crack one or more windows of the autonomous vehicle 10 and/or may control the HVAC system 15 to increase air circulation within the autonomous vehicle 10.

While a passenger is present within the autonomous vehicle 10, the controller 12 may only take incremental measures to remediate the smoke or odors within the autonomous vehicle 10. For example, because the passenger present in the autonomous vehicle 10 did not already open one or more windows of the autonomous vehicle 10 or increase air circulation of the HVAC system 15, it can be assumed that the passenger did not wish to take those actions. The controller 12, however, may crack the window or slightly increase circulation in an attempt to somewhat remediate and purge the smoke or odors within the autonomous vehicle 10 without disturbing the passenger.

Once the passenger is dropped off at the passenger's destination, the controller 12 may take more aggressive action to remediate and purge the smoke or odors within the autonomous vehicle 10. For example, the controller 12 may control the window actuator system 17 to fully open all of the windows of the autonomous vehicle 10. For further example, the controller 12 may control the HVAC system 15 to increase air circulation and air conditioning to a maximum level. Alternatively, the controller 12 may increase a fan speed of one or more air circulation fans of the HVAC system 15 to a maximum level and fully open one or more ambient air vents to blow fresh outdoor air into the vehicle cabin and purge any smoke or odors present in the autonomous vehicle.

The controller 12 receives information about outdoor odor and air quality conditions from the outdoor odor/air quality sensor(s) 26. In the event the outdoor air is such that there are higher levels of smoke and/or odors outside the autonomous vehicle 10 than there are inside the autonomous vehicle 10, the controller 12 may close the ambient air vents of the HVAC system 15 to prevent outdoor air from entering the vehicle cabin and may increase air circulation within the HVAC system 15 in an attempt to filter out any smoke or odors within the cabin of the autonomous vehicle 10.

The controller 12 also receives information about weather conditions from the weather condition sensor(s) 28. In the event that it is raining or exceptionally cold outside, the controller 12 may wait to open any windows of the autonomous vehicle 10 until any passengers have exited the autonomous vehicle 10 and have been dropped at their designated destination.

Figure 2:
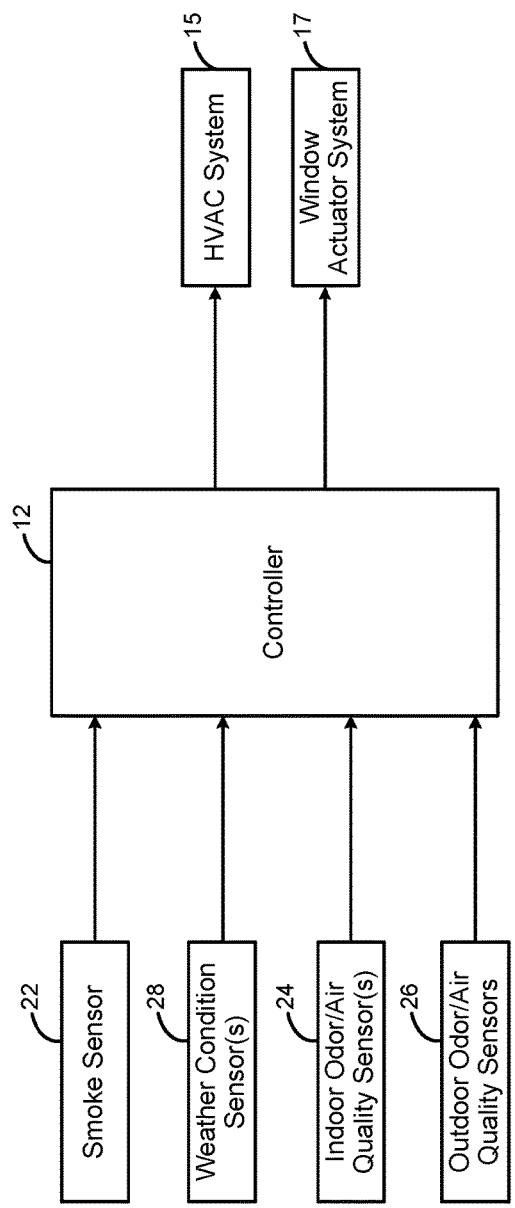
FIG. 2 illustrates a block diagram of an air quality sensing and purge system according to the present teachings.

With reference to FIG. 2, a block diagram of an air quality sensing and purge system according to the present teachings is illustrated. As discussed above, the controller 12 receives information from the smoke sensor 22, the weather condition sensor(s) 28, the indoor odor/air quality sensor(s) 24, and the outdoor odor/air quality sensor(s) 26 and generates outputs to the HVAC system 15 and the window actuator system 17. For example, as discussed above, based on the information from the various sensors, the controller 12 controls the HVAC system 15 and/or the window actuator system 17 to remediate and purge any smoke or odors from the interior cabin of the autonomous vehicle 10 by opening windows using the window actuator system 17, by increasing air circulation with the HVAC system 15, and/or by increasing a flow of outdoor air into the cabin of the autonomous vehicle 10.

Figure 3:
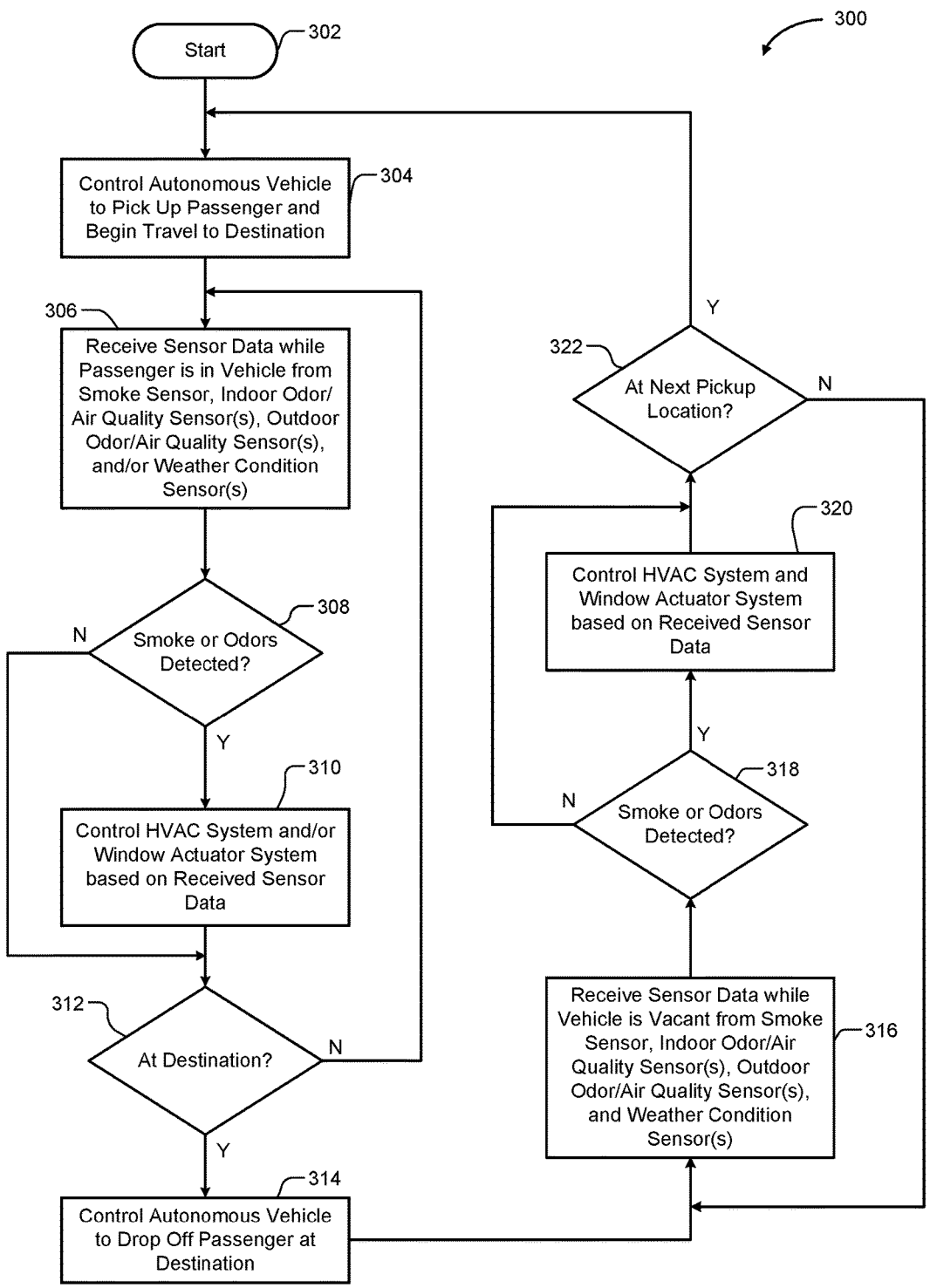
FIG. 3 illustrates a flow diagram of a method for air quality sensing and purging according to the present teachings.

With reference to FIG. 3, a flow diagram of a method 300 for air quality sensing and purging according to the present teachings is illustrated. The method 300 can be performed by the controller 12 of the autonomous vehicle 10 and begins at 302. At 304, the controller 12 controls the autonomous vehicle 10 to pick up a passenger at a designated location and begins to travel to the destination indicated by the passenger. As discussed above, the passenger may make a request for transportation using an application of a smartphone that is in communication with a server that is also in communication with the controller 12. The passenger may enter a destination into the smartphone application and the smartphone application may communicate both the entered destination and the location of the smartphone to the server, which deploys the autonomous vehicle 10 to the passenger's location for pickup and transportation to the entered destination. The autonomous vehicle 10 may include one or more passenger detection sensors to detect whether passengers are present in the autonomous vehicle 10. In this way, the controller 12 can determine, based on the data from the one or more passenger detection sensors that passenger(s) have entered the vehicle. Additionally or alternatively, the controller 12 can determine that passenger(s) have entered the vehicle based on the vehicle request control logic. For example, the controller 12 can determine that passenger(s) have entered the autonomous vehicle 10 once the autonomous vehicle 10 has arrived at the pickup location and the doors of the autonomous vehicle 10 have been opened and closed.

At 306, the controller 12 receives sensor data from the smoke sensor 22, the indoor odor/air quality sensor(s) 24, the outdoor odor/air quality sensor(s) 26, and/or the weather condition sensor(s) 28 while the passenger is in the autonomous vehicle 10 and the autonomous vehicle 10 is traveling to the entered destination. At 308, the controller 12 determines whether smoke or odors are detected in the autonomous vehicle 10 based on the sensor data received from the smoke sensor 22 and/or the indoor odor/air quality sensor(s) 24.

At 308, when smoke or odors are detected within the autonomous vehicle 10, the controller 12 proceeds to 310 and controls the HVAC System 15 and/or the window actuator system 17, based on the received sensor data, to purge and exhaust the smoke or odors from the autonomous vehicle 10 as discussed above. For example, if smoke is detected in the autonomous vehicle 10 by the smoke sensor 22, the controller may control the window actuator system 17 to crack one or more windows of the autonomous vehicle 10 and/or may control the HVAC system 15 to increase air circulation within the autonomous vehicle 10. The HVAC system 15, for example, may include an air filter that can remove smoke and/or odors from the circulated air within the autonomous vehicle. Similarly, if the indoor odor/air quality senses the presence of an odor within the autonomous vehicle 10 while a passenger is present in the autonomous vehicle 10, the controller may crack one or more windows of the autonomous vehicle 10 and/or may control the HVAC system 15 to increase air circulation within the autonomous vehicle 10.

As discussed above, while a passenger is present within the autonomous vehicle 10, the controller 12 may only take incremental measures to remediate the smoke or odors within the autonomous vehicle 10. For example, because the passenger present in the autonomous vehicle 10 did not already open one or more windows of the autonomous vehicle 10 or increase air circulation of the HVAC system 15, it can be assumed that the passenger did not wish to take those actions. The controller 12, however, may crack the window or slightly increase circulation in an attempt to somewhat remediate and purge the smoke or odors within the autonomous vehicle 10 without disturbing the passenger.

In the event the outdoor odor/air quality sensor(s) 26 indicate that the outdoor air is such that there are higher levels of smoke and/or odors outside the autonomous vehicle 10 than there are inside the autonomous vehicle 10, the controller 12 may, at 310, close the ambient air vents of the HVAC system 15 to prevent outdoor air from entering the vehicle cabin and may increase air circulation within the HVAC system 15 in an attempt to filter out any smoke or odors within the cabin of the autonomous vehicle 10. In the event the weather condition sensor(s) 28 indicate that it is raining, snowing, or exceptionally cold outside, the controller 12 may wait to open any windows of the autonomous vehicle 10 until any passengers have exited the autonomous vehicle 10 and have been dropped at their designated destination.

After controlling the HVAC system 15 and/or the window actuator system at 310, the controller 12 proceeds to 312. Also, at 308 when smoke or odors are not detected within the autonomous vehicle 10, the controller proceeds to 312.

At 312, the controller 12 determines whether the autonomous vehicle 10 is at the entered destination. When the autonomous vehicle 10 is not at the entered destination, the controller 12 loops back to 306 and continues to monitor data from the various sensors of the autonomous vehicle 10 and control the HVAC system 15 and the window actuator system 17, as necessary, as described above.

At 312, when the controller 12 determines that the autonomous vehicle 10 is at the entered destination, the controller 12 controls the autonomous vehicle 10 to drop off the passenger by, for example, pulling over and stopping at the destination and unlocking or opening the doors of the autonomous vehicle 10.

At 316, with the autonomous vehicle 10 now empty of passengers, the controller 12 again receives sensor data from the smoke sensor 22, the indoor odor/air quality sensor(s) 24, the outdoor odor/air quality sensor(s) 26, and/or the weather condition sensor(s) 28.

At 318, the controller 12 determines whether smoke or odors are detected in the autonomous vehicle 10 based on the sensor data received from the smoke sensor 22 and/or the indoor odor/air quality sensor(s) 24.

At 318, when smoke or odors are detected within the autonomous vehicle 10, the controller 12 proceeds to 320 and controls the HVAC System 15 and/or the window actuator system 17, based on the received sensor data, to purge and exhaust the smoke or odors from the autonomous vehicle 10 as discussed above. For example, once the passenger is dropped off at the passenger's destination and the autonomous vehicle 10 is empty of passengers, the controller 12 may take more aggressive action to remediate and purge the smoke or odors within the autonomous vehicle 10. For example, the controller 12 may control the window actuator system 17 to fully open all of the windows of the autonomous vehicle 10. For further example, the controller 12 may control the HVAC system 15 to increase air circulation and air conditioning to a maximum level. Alternatively, the controller 12 may increase a fan speed of one or more air circulation fans of the HVAC system 15 to a maximum level and fully open one or more ambient air vents to blow fresh outdoor air into the vehicle cabin and purge any smoke or odors present in the autonomous vehicle.

In the event the outdoor odor/air quality sensor(s) 26 indicate that the outdoor air is such that there are higher levels of smoke and/or odors outside the autonomous vehicle 10 than there are inside the autonomous vehicle 10, the controller 12 may, at 320, close the ambient air vents of the HVAC system 15 to prevent outdoor air from entering the vehicle cabin and may increase air circulation within the HVAC system 15 in an attempt to filter out any smoke or odors within the cabin of the autonomous vehicle 10. In addition, if the weather condition sensor(s) 28 indicate that it is raining or snowing outside of the autonomous vehicle 10, the controller 12 may control the window actuator system to only crack the windows or to leave the windows of the autonomous vehicle 10 closed until it is no longer raining or snowing outside.

After controlling the HVAC system 15 and/or the window actuator system 17 at 310, the controller 12 proceeds to 322.

Also, at 318 when smoke or odors are not detected within the autonomous vehicle 10, the controller proceeds to 322.

At 322, the controller 12 determines whether the autonomous vehicle is at the next passenger pickup location. At 322, when the autonomous vehicle 10 is at the next passenger pickup location, the controller 12 loops back to step 304 and begins the method 300 again. At 322, when the autonomous vehicle 10 is not yet at the next pickup location, the controller loops back to 316 and continues to monitor data from the various sensors of the autonomous vehicle 10 and control the HVAC system 15 and/or the window actuator system 17, as necessary, as described above. For example, the autonomous vehicle may be traveling to its next passenger pickup location or may be waiting to receive the next passenger pickup location.

In this application, including the definitions below, the terms "module," "controller," control module," and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the modules, controllers, control modules, and systems described herein. In addition, in this application the terms "module," "controller," or "control module" may be replaced with the term "circuit."

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
at least one sensor that generates data related to indoor air conditions of an autonomous vehicle, the at least one sensor including at least one of a smoke sensor and an odor/air quality sensor; and
a controller in communication with the at least one sensor, the controller being configured to: (i) detect at least one of smoke and an odor within the autonomous vehicle based on the data related to indoor air conditions of the autonomous vehicle received from the at least one sensor, (ii) determine whether the autonomous vehicle is occupied by a passenger, (iii) control a window actuator system of the autonomous vehicle to increase an opening of at least one window of the autonomous vehicle to a first opening level, the first opening level of the at least one window being less than a maximum opening level of the at least one window, in response to detecting the at least one of the smoke and the odor and in response to determining that the autonomous vehicle is occupied by the passenger, (iv) determine when the passenger has exited the autonomous vehicle, and (v) control the window actuator system to increase the opening of the at least one window to the maximum opening level in response to determining that the passenger has exited the autonomous vehicle to exhaust the at least one of the smoke and the odor from the autonomous vehicle.

2. The system of claim 1, wherein the autonomous vehicle includes an HVAC system and wherein the controller controls the HVAC system to increase airflow within the autonomous vehicle in response to the at least one sensor detecting the at least one of the smoke and the odor within the autonomous vehicle.

3. The system of claim 1, wherein the autonomous vehicle includes an HVAC system and wherein the controller controls the HVAC system to increase air flow within the autonomous vehicle to a first level of air flow in response to the at least one sensor detecting the at least one of the smoke and the odor within the autonomous vehicle and in response to determining that the autonomous vehicle is occupied by the passenger and controls the HVAC system to increase air flow within the autonomous vehicle to a second level of air flow in response to the at least one sensor detecting the at least one of the smoke and the odor within the autonomous vehicle and in response to determining that the passenger has exited the autonomous vehicle, the first level of air flow being less than the second level.

4. The system of claim 1, further comprising at least one outdoor odor/air quality sensor, wherein the controller controls the window actuator system based on data from the outdoor odor/air quality sensor.

5. The system of claim 1, further comprising at least one weather condition sensor, wherein the controller controls the window actuator system based on data from the weather condition sensor.

6. The system of claim 1, wherein the at least one sensor includes the smoke sensor and the odor/air quality sensor, the system further comprising at least one outdoor odor/air quality sensor and at least one weather condition sensor, and wherein the controller controls the window actuator system based on data from the smoke sensor, the odor/air quality sensor, the at least one outdoor odor/air quality sensor, and the at least one weather condition sensor.

7. A method comprising:
generating, with at least one sensor, data related to indoor air conditions of an autonomous vehicle, the at least one sensor including at least one of a smoke sensor and an odor/air quality sensor;
receiving, with a controller, the generated data related to indoor air conditions of the autonomous vehicle;
detecting, with the controller, at least one of smoke and an odor within the autonomous vehicle based on the generated data related to indoor air conditions of the autonomous vehicle;
determining, with the controller, whether the autonomous vehicle is occupied by a passenger;
controlling, with the controller, a window actuator system of the autonomous vehicle to increase an opening of at least one window of the autonomous vehicle to a first opening level, the first opening level of the at least one window being less than a maximum opening level of the at least one window, in response to detecting the at least one of the smoke and the odor and in response to determining that the autonomous vehicle is occupied by the passenger;
determining, with the controller when the passenger has exited the autonomous vehicle; and
controlling, with the controller, the window actuator system to increase the opening of the at least one window to the maximum opening level in response to determining that the passenger has exited the autonomous vehicle to purge exhaust the at least one of the smoke and the odor detected within the autonomous vehicle.

8. The method of claim 7, wherein the autonomous vehicle includes an HVAC system and wherein the controller controls the HVAC system to increase airflow within the autonomous vehicle in response to the at least one sensor detecting the at least one of the smoke and the odor within the autonomous vehicle.

9. The method of claim 7, wherein the autonomous vehicle includes an HVAC system and wherein the controller controls the HVAC system to increase air flow within the autonomous vehicle at a first level of air flow in response to the at least one sensor detecting the at least one of the smoke and the odor within the autonomous vehicle and in response to determining that the autonomous vehicle is occupied by the a passenger and controls the HVAC system to increase air flow within the autonomous vehicle to a second level of air flow in response to the at least one sensor detecting the at least one of the smoke and the odor within the autonomous vehicle and in response to determining that the passenger has exited the autonomous vehicle, the first level of air flow being less than the second level.

10. The method of claim 7, further comprising generating outdoor air quality data with at least one outdoor odor/air quality sensor, wherein the controller controls the window actuator system based on the outdoor air quality data from the outdoor odor/air quality sensor.

11. The method of claim 7, further comprising generating weather data with at least one weather condition sensor, wherein the controller controls the window actuator system based on the weather data from the weather condition sensor.

12. The method of claim 7, wherein the at least one sensor includes the smoke sensor and the odor/air quality sensor, the method further comprising:
generating, with at least one outdoor odor/air quality sensor, outdoor air quality data; and
generating, with at least one weather condition sensor, weather condition data;
wherein the controller controls the window actuator system based on data from the smoke sensor and the odor/air quality sensor, based on the outdoor air quality data from the at least one outdoor odor/air quality sensor, and based on the weather condition data from the at least one weather condition sensor.

* * * * *

UNITED STATES PATENT AND TRADEMARK OFFICE
CERTIFICATE OF CORRECTION

PATENT NO.        : 10,286,918 B2
APPLICATION NO.   : 15/252666
DATED             : May 14, 2019
INVENTOR(S)       : Mullett Page 1 of 1

It is certified that error appears in the above-identified patent and that said Letters Patent is hereby corrected as shown below:

In the Claims

Column 9, Claim 1, Line 2, after "vehicle", delete "¶"

Column 10, Claim 9, Line 27, after "the", delete "a"

Signed and Sealed this
Thirtieth Day of July, 2019

Andrei Iancu
*Director of the United States Patent and Trademark Office*